United States Patent

Zimmerman

[11] Patent Number: 5,850,779
[45] Date of Patent: Dec. 22, 1998

[54] PAN TILTING APPARATUS

[76] Inventor: John A. R. Zimmerman, 7826 W. Flower St., Phoenix, Ariz. 85033

[21] Appl. No.: 963,207

[22] Filed: Nov. 3, 1997

[51] Int. Cl.$^6$ .......................... A47J 37/10; A47G 23/02; F24C 15/10

[52] U.S. Cl. .................. 99/425; 99/400; 99/422; 99/446; 126/215; 126/216; 248/152; 248/346.01; 248/346.5

[58] Field of Search ............. 99/422–425, 407, 99/400, 447–450, 444–446; 126/215, 216; 248/152, 346.5, 688, 346.01; D7/407, 408, 366

[56] References Cited

U.S. PATENT DOCUMENTS

| | | | |
|---|---|---|---|
| D. 284,543 | 7/1986 | Huls | D7/409 |
| 862,719 | 8/1907 | Davis | 126/215 |
| 2,499,083 | 2/1950 | Ashworth et al. | 99/425 |
| 2,871,848 | 2/1959 | Wall et al. | 99/425 X |
| 2,903,229 | 9/1959 | Lange | 126/215 |
| 3,744,475 | 7/1973 | Myler et al. | 99/407 |
| 3,871,356 | 3/1975 | Saponara | 126/215 |
| 3,964,378 | 6/1976 | Dunkelman | 99/425 |
| 4,832,295 | 5/1989 | Wagner | 248/152 |
| 5,238,127 | 8/1993 | Geller | 211/13 |
| 5,315,983 | 5/1994 | Law | 126/216 |
| 5,323,693 | 6/1994 | Collard et al. | 99/425 |
| 5,467,696 | 11/1995 | Everhart | 99/425 |

*Primary Examiner*—Timothy F. Simone
*Attorney, Agent, or Firm*—David L. Volk

[57] ABSTRACT

A structure is adapted to rest on a top surface of an oven, surrounding a burner of the oven. The structure is adapted to support a pan such that the pan is tilted and positioned above the burner. The structure further comprises a barrier depending outwardly from the structure for keeping the pan from sliding off of the structure.

3 Claims, 3 Drawing Sheets

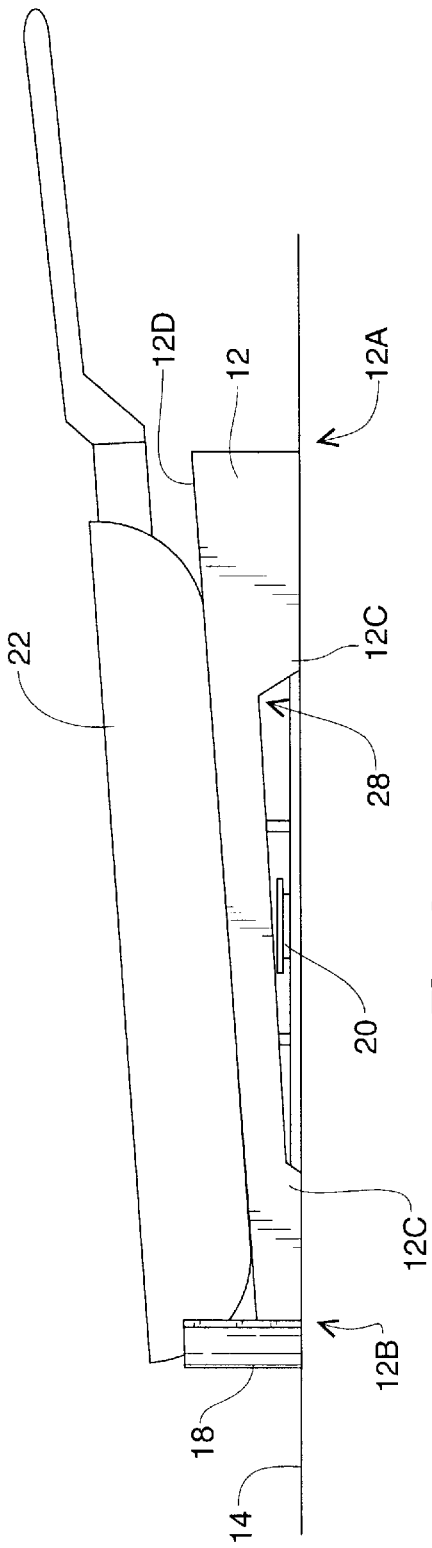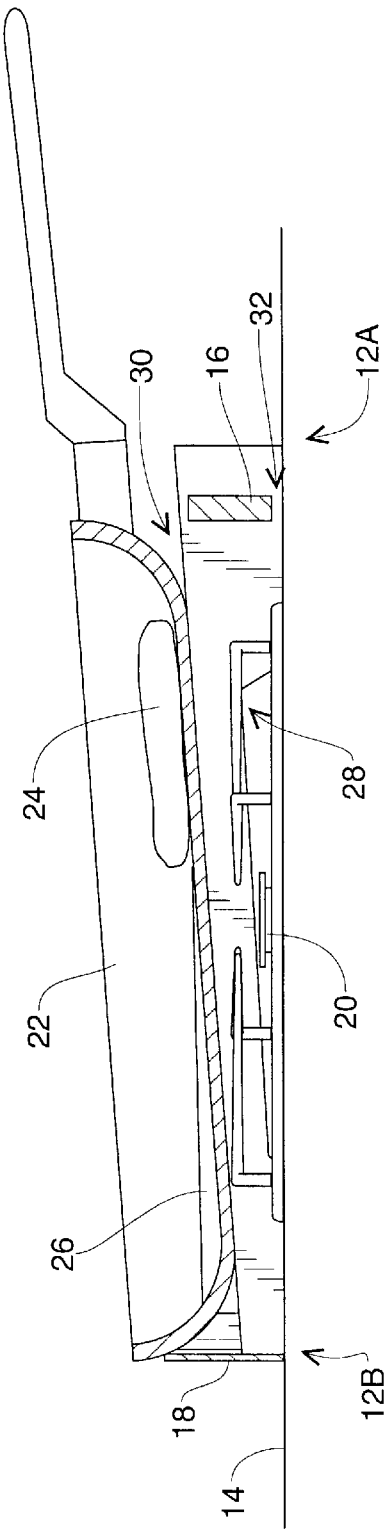

PAN TILTING APPARATUS

BACKGROUND OF THE INVENTION

1. Field of the Invention

The present invention relates to cooking accessories used on stove tops, particularly to pan holders.

2. Description of the Related Art

Pan fried foods are enjoyed by many people throughout the United States and internationally. A problem with pan fried foods, is that the food item lies in its own fat in the bottom of the pan while cooking. Because people have become more concerned about their health, and more aware of how what they eat affects their health, they now enjoy eating pan fried foods less often. When pan fried foods are eaten, it is often accompanied by a sense of guilt.

An apparatus of the prior art for solving this problem is a specially made pan with ridges and channels in the bottom cooking surface of the pan. The food item sits on the tops of the ridges, and the fat flows into the channels, away from the food. The drawback with this invention is that the pans themselves are expensive compared to conventional pans. A cook who wants to take advantage of this invention would not be able to use his or her own existing cookware.

What is needed is an apparatus which keeps fat away from the food while pan frying, while still allowing conventional pans to be used in the process.

SUMMARY OF THE INVENTION

The pan tilting apparatus of the present invention includes a structure adapted to rest on a top surface of an oven, surrounding a burner of the oven. The structure is adapted to support a pan such that the pan is tilted and positioned above the burner. The structure further comprises a barrier depending outwardly from the structure for keeping the pan from sliding off of the structure.

Because the pan is tilted, grease in the bottom of the pan flows to one end of the pan, away from the food item within the pan.

Still further features and advantages will become apparent from the ensuing description and drawings.

BRIEF DESCRIPTION OF THE DRAWINGS

FIG. 3 is an elevational view of the pan tilting apparatus.

FIG. 4 is a cross-sectional view taken along line 4—4 of FIG. 2.

DETAILED DESCRIPTION

Figure 1:
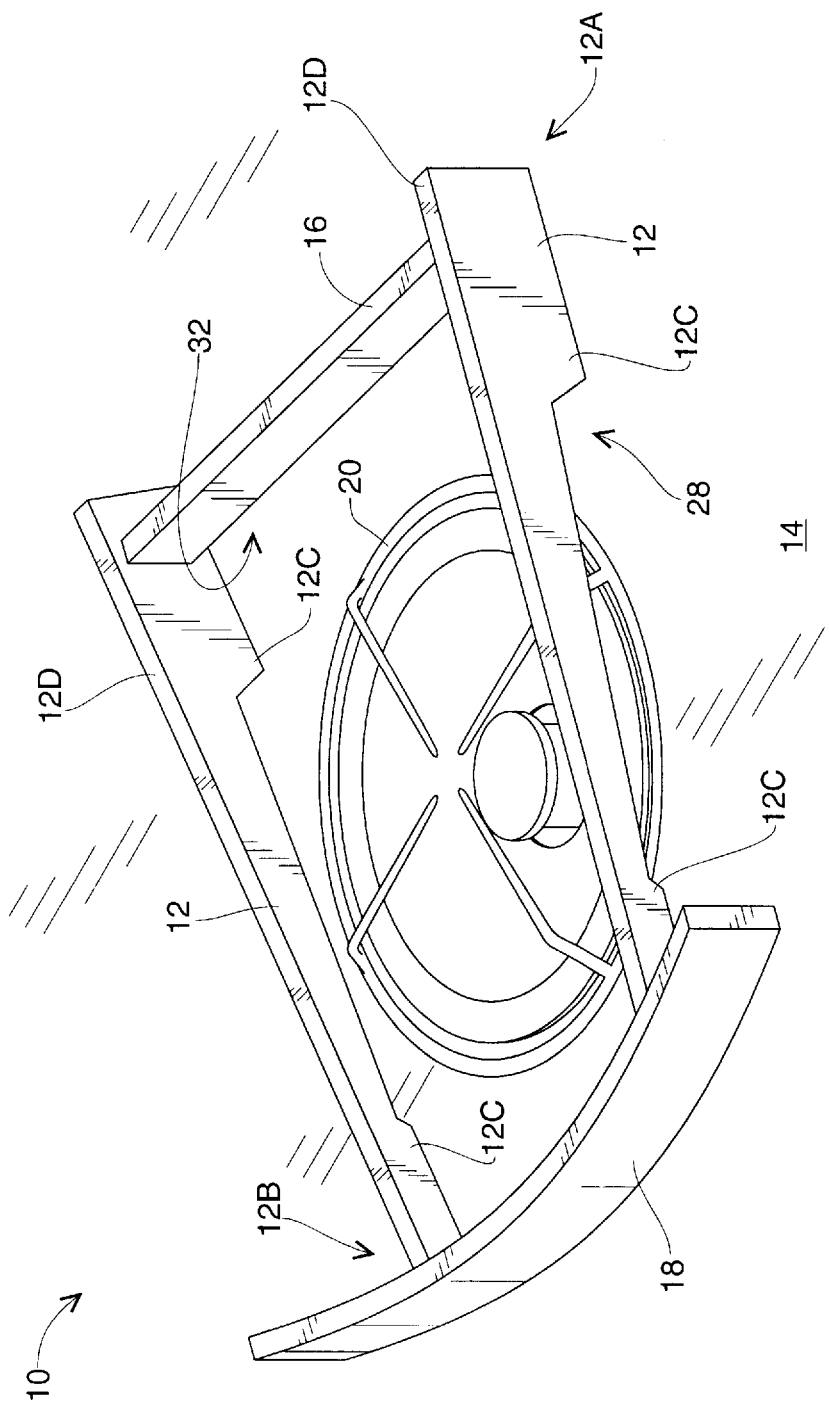
FIG. 1 is a perspective view of the pan tilting apparatus of the present invention.

FIG. 1 is a perspective view of a pan tilting apparatus 10 of the present invention. The apparatus 10 comprises two support rails 12, each support rail 12 having a first end 12A and a second end 12B. Each support rail 12 includes a leg 12C at each of the first and second ends 12A, 12B.

Each of the support rails 12 has a first edge 12D disposed opposite the legs 12C. When the legs 12C are resting on a horizontal top surface 14 of an oven, and supporting the support rails 12 above the legs 12C, the first edge 12D of each support rail 12 forms an acute angle with respect to the top surface 14, and the first edge 12D is closer to the top surface 14 at the second end 12B of the support rail 12 than at the first end of 12A of the support rail 12.

A connecting rail 16 spans between the first ends 12A of the support rails 12. The first edges 12D of the support rails 12 at the first ends 12A extend beyond the connecting rail 16.

A barrier rail 18 spans between the second ends 12B of the support rails 12. The barrier rail 18 extends beyond the first edges 12D of the support rails 12 at the second ends 12B.

The support rails 12, the connecting rail 16 and the barrier rail 18 are spaced from one another sufficiently to surround a burner 20 of an oven.

Figure 2:
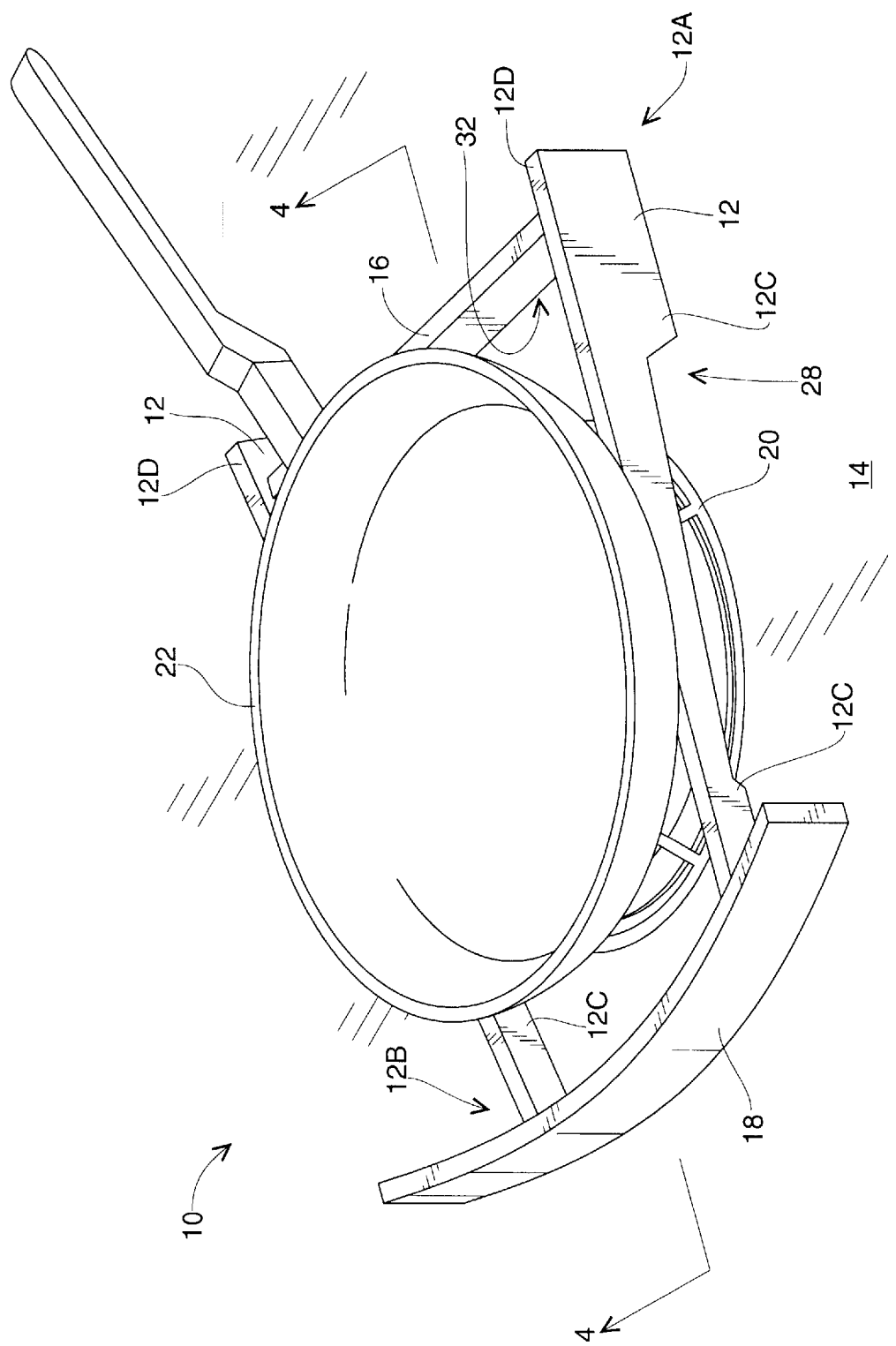
FIG. 2 is a perspective view of the pan tilting apparatus, with a pan resting thereon.

FIG. 2 is a perspective view of the pan tilting apparatus 10, with a pan 22 resting thereon. FIG. 3 is an elevational view of the pan tilting apparatus 10. FIG. 4 is a cross-sectional view taken along line 4—4 of FIG. 2. Referring to FIGS. 2–4, when the pan 22 is resting on the support rails 12, it is tilted so that liquids 26 which cook out of the food 24 drain away from the food 24. The pan 22 rests against the barrier rail 18, which keeps the pan 22 from sliding off of the support rails 12.

Apertures 28 are formed between the legs 12C which allow air to flow beneath the support rails 12 to the burner 20, and permit viewing of the burner 20 through the apertures 28. Because the first edges 12D of the support rails extend beyond the connecting rail 16, a gap 30 is ensured between the connecting rail 16 and the pan 22, which also allows air to flow to the burner 20, and permits viewing of the burner 20 through the gap 30.

Because the legs 12C extend below the connecting rail 16, a lower gap 32 is formed between the connecting rail 16 and the top surface 14 of the oven, which also allows air to flow to the burner 20, and permits viewing of the burner 20 through the lower gap 32.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A pan tilting apparatus comprising a structure adapted to rest on a top surface of an oven, surrounding a burner of the oven, the structure adapted to support a pan such that the pan is tilted and positioned above the burner, the structure further comprising a barrier depending outwardly from the structure for keeping the pan from sliding off of the structure, the structure further comprising legs extending from the structure for defining apertures between the structure and the top surface of the oven when the legs are resting on the top surface of the oven and supporting the structure, to permit air flow to the burner, and viewing of the burner through the apertures.

2. A pan apparatus comprising:
   a. two support rails adapted to support a pan in a tilted manner above a burner of an oven, the support rails positioned on opposing sides of the burner and resting, on a top surface of the oven;
   b. each support rail having a first end and a second end;
   c. a connecting rail spanning between the first ends of the support rails, and
   d. a barrier rail spanning between the second ends of the support rails for preventing a pan from sliding off of the support rails.

3. A pan apparatus comprising:
   a. two support rails, each support rail having a first end and a second end;

b. each support rail having a leg at each of the first and second ends;
c. each of the support rails having a first edge disposed opposite the legs;
d. the first edge oriented relative to the legs such that when the legs are resting on a horizontal surface and supporting the support rail above the legs, the first edge forms an acute angle with respect to the horizontal surface, the first edge being closer to the horizontal surface at the second end of the support rail than at the first end of the support rail;
e. a connecting rail spanning between the first ends of the support rails, the first edges of the support rails at the first ends extending beyond the connecting rail; and
f. a barrier rail spanning between the second ends of the support rails, the barrier rail extending beyond the first edges of the support rails at the second ends.

* * * * *